UNITED STATES PATENT OFFICE.

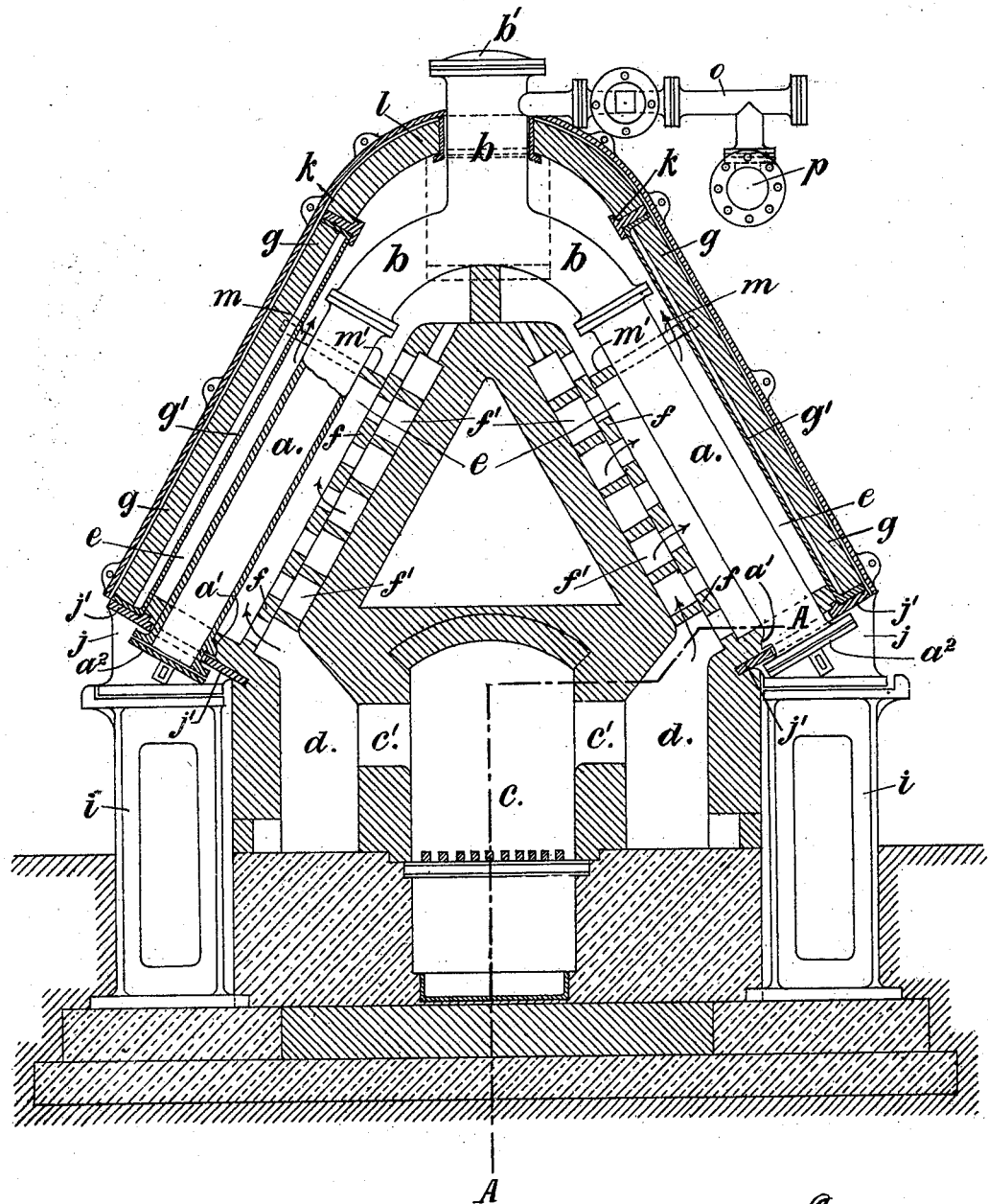

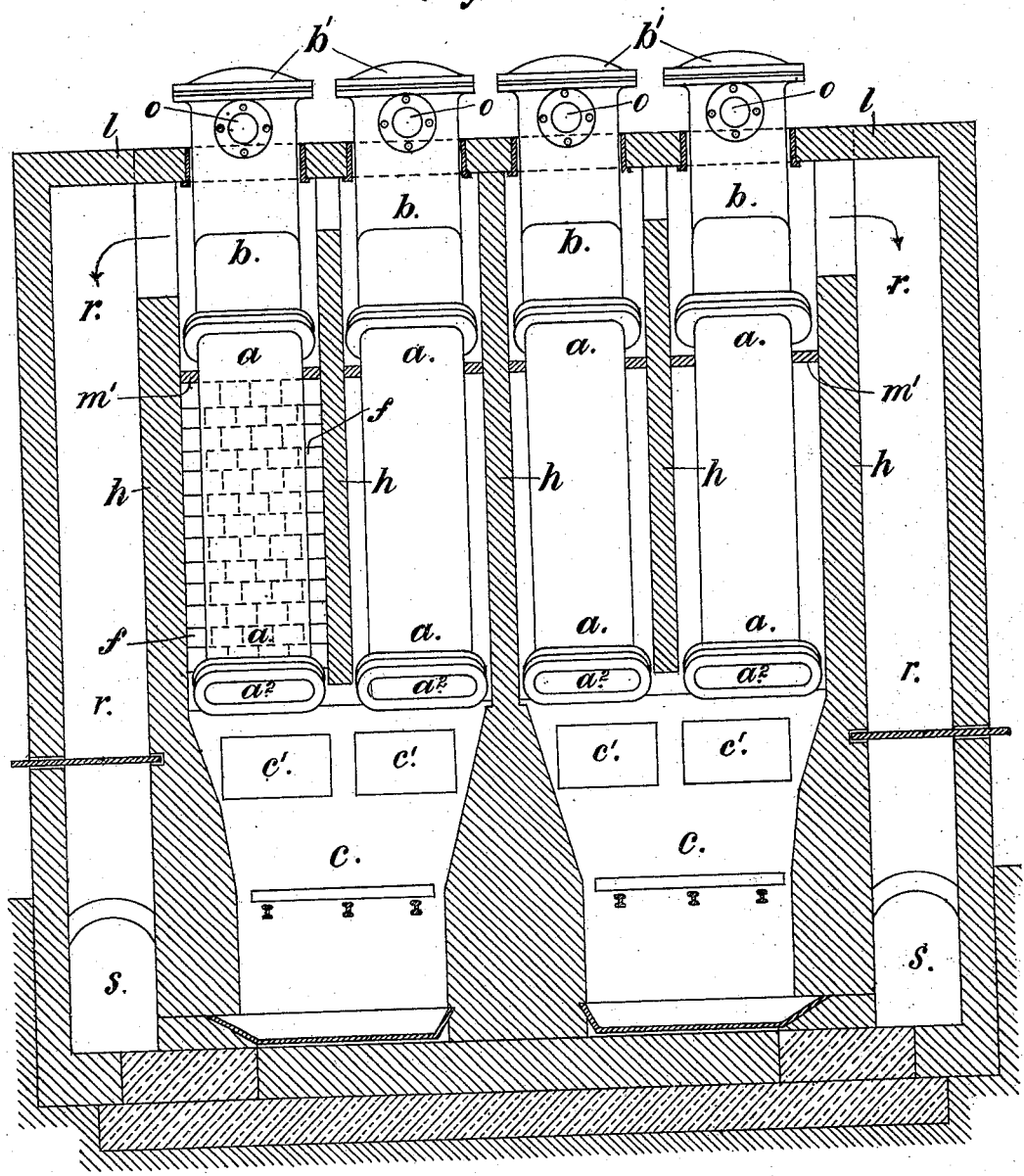

JOSEF L. HAWLICZEK, OF LIVERPOOL, ENGLAND.

PROCESS OF MAKING ACETONE.

SPECIFICATION forming part of Letters Patent No. 690,724, dated January 7, 1902.

Application filed February 21, 1899. Serial No. 706,392. (No specimens.)

*To all whom it may concern:*

Be it known that I, JOSEF LUDWIG HAWLICZEK, a subject of the Queen of Great Britain, and a resident of Liverpool, England, have invented certain new and useful Improvements in the Manufacture of Acetone, of which the following is a specification.

This invention has reference to the manufacture of acetone, and has mainly for its object to produce it at a cost considerably below that at which it is at present produced and at the same time to improve the yield of acetone and its manufacture generally.

According to the method by which acetone is now generally produced acetate salts of an alkaline earth or metal acetates are subjected to dry or destructive distillation. In common practice, however, it is the brown or gray acetate of lime of commerce which is used for that purpose, owing to its being relatively cheap and easily obtained. This acetate of lime is a secondary or by-product in wood-charcoal making; but, nevertheless, in consequence of the small yield and the tedious mode of its manufacture it commands a high market value. It has also been attempted to produce acetone by the direct conversion of liquid acetic acid; but this method of manufacture is not practicable. By the present invention the employment of the expensive materials referred to are obviated, and thus the saving above referred to is attained, together with improvements generally in the efficiency of the process or method of manufacture.

According to my invention I employ as the primary raw material for the production of acetone wood, sawdust, peat, "turf," or any organic substance which yields acetic acid on being subjected to destructive distillation, and this material is treated and subjected to dry or destructive distillation in the manner hereinafter described, with the effect that the acetic acid so obtained is directly converted into acetone.

In the manufacture of acetone from substances as above named they are impregnated, coated, or mixed, as the case may be, with the oxid, hydrated oxid, or carbonate of an alkaline earth, or similar compounds of certain heavy metals, or the acetate salts of the same, or such salts of the same groups, which on heating leave behind their respective oxid or carbonate, and the organic substance so impregnated, coated, or mixed is subjected to the process of dry or destructive distillation. By this method or process I find the acetic acid formed is directly and wholly or nearly wholly converted into acetone. This acetone passes away as vapor mixed with the other volatile products, such as wood-tar and methyl-alcohol, and they are condensed in suitable condensing apparatus and collected. The liquid products of condensation so obtained are separated from the tar by decantation, while the acetone is separated from the methyl-alcohol by rectification in any known suitable way.

With regard to the alkaline earths referred to, magnesia is one which may be used with advantage, and as regards the metals, their oxids or salts of same referred to, lead, zinc, or copper or their oxids or salts are very suitable and may be successfully employed.

When wood is employed as the organic substance, the charcoal produced by this process is quite suitable for any ordinary use and is not inferior in quality to the charcoal made in the ordinary way, inasmuch as it only contains a slightly-higher amount of mineral matter than the latter one. If, however, charcoal of a very high standard is required, it may easily be freed from nearly all mineral contaminations by merely washing it with acidified water.

In practice when lime or lime salts are used I prefer to make use of them for the purpose of mixing, coating, or impregnating the organic substances; but I do not confine myself to the use only of lime or lime salts, as the other aforementioned mineral substances may also be suitable. If wood, peat, or other similar materials be treated, I may mix or coat them with lime (which includes hydrated lime) or lime salts, and in some cases perform this operation in vacuum, so as to facilitate a perfect impregnation of the fiber of the material with the mineral matter. If sawdust or a physically like organic substance is to be treated, I prefer to conglomerate it with hydrated lime and form the compound or mass into blocks of convenient size previous to being subjected to destructive distillation. However, the employment or application of the one mode or the other will vary as the case may individually demand.

As a modified method under this invention of the method above described acetone may also be directly produced from wood or like substances by subjecting wood to the destructive distillation and by passing the combined vapors of distillation over the mineral matters above specified or referred to at an elevated temperature; but I prefer (unless to meet special cases) to employ the process or method first described as being the simpler and more economical and satisfactory in every respect.

A suitable form or construction of distilling apparatus is shown in the annexed drawings, in which—

Figure 1 is a cross-section, and Fig. 2 a longitudinal section, showing the inside of the retort-chamber with the outside cover of this chamber removed and the lower part in section through A A, Fig. 1.

Referring to the drawings, $a\ a$ are pairs of inclined retorts, $b$ is a vertical bifurcated neck common to the ends of these pairs of retorts, through which the material to be subjected to destructive distillation is introduced, and $b'$ shows the charging doors or covers thereon.

$c$ represents furnaces, on which heating fuel is burned, and $d$ represents flame or gas flues communicating with $c$ by the openings $c'$ and with the chambers $e$ above, in which the retorts $a$ are deposited and set. These chambers $e$ are comprised of the hollow floor of brickwork $f$, having checkered openings, and the space $f'$ below it, through which the gases pass to the chamber-space $e$, an outer cover-wall $g$, and end or division walls $h$. The chamber-walls of $e$ overhang the basework of the structure, as shown by the drawings, and are largely supported from below by the columns $i$ and brackets or girders $j$, the upper plates $j'$ of which extend from one support to another. Through these plates $j'$ the ends of the retort $a$ project, they being largely supported by these plates by projecting ledges $a'$ on their back sides, which rest on the inside of the plates. The outer cover-walls $g$ rest at one end on the outer edges of the plates $g'$ and at the other upon a girder $k$ above, and they have linings of iron, which rest on these supports. By this construction these outer cover-walls $g'$ can be readily taken down and put in place. Above the girders $k$ there is a dome or roof $l$, inclosing the upper bifurcated branches $b$ of the retorts.

In action fire-gases pass from the furnace $c$ up into the space $f'$ below the floor $f$, and thus through these spaces in the said floor into the chamber $e$, and they pass from this chamber by an opening $m$ in the upper part of the walls $m'$. By this wall $m'$ and its upper outlet-opening and the distributing-floor $f$ the flow of gases into the chamber $e$ and the heating action upon the retorts $a$ is well distributed and fairly equalized and the uniform distillation of the materials in the retort accomplished. The heating-gases in passing into the upper part of the apparatus pass away into the downtake-flues $r$ to the flues $s$ below, by which they are conducted away from the apparatus to the chimney. As regards the distilling action volatile matters are driven off from the materials with which the retorts are charged and the vapors or gases of distillation pass up from the charge into the neck $b$ and away by pipes $o$ into the main $p$ to the condensers, which will be of any known suitable kind. The material to be distilled is charged into the retorts through the charging doors or covers $b'$ and neck $b$, and after the volatile constituents of the materials are distilled the charcoal or carbon remaining is discharged from the retorts by opening lower retort-doors $a^2$, whereupon the discharge of this carbon will be automatic by reason of their angle of inclination being greater than the angle of repose of this material.

In the case of the modified method of manufacture of acetone, wherein the wood is first subjected to distillation and the vapors of distillation are then passed over the mineral matters at an elevated temperature, the apparatus substantially as shown and described may be employed. In one case the alkaline earth or heavy metal in any suitable physical form may be placed directly on top of or mixed in among the wood or organic substance in the retorts, or there may be employed in the brickwork-setting of the plant other retorts or chambers heated by the heating-gases for and containing the mineral substances, through which substances while in a highly-heated state the products of distillation are passed directly from the distilling portion of the apparatus.

What is claimed in respect of the herein-described invention is—

The herein-described process of manufacturing acetone direct from wood, and an alkaline earth, consisting in cutting wood into blocks of a suitable size for handling, as described, coating such wood blocks with fluid lime and water, by immersing them therein, subsequently subjecting these combined substances to heat in a closed and externally-heated vessel, heated to a temperature below bright-red heat, and subsequently artificially cooling the said resultant vapors of distillation; substantially as described.

In witness whereof I have hereunto set my hand in presence of two witnesses.

JOSEF L. HAWLICZEK.

Witnesses:
 ERNEST R. ROYSTON,
 JOHN H. WALKER.